US012111733B2

(12) United States Patent
Knierim et al.

(10) Patent No.: US 12,111,733 B2
(45) Date of Patent: Oct. 8, 2024

(54) ORCHESTRATING A CONTAINER-BASED APPLICATION ON A TERMINAL DEVICE

(71) Applicant: Siemens Aktiengesellschaft, Munich (DE)

(72) Inventors: Christian Muff Knierim, Munich (DE); Christian Peter Feist, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/352,439

(22) Filed: Jun. 21, 2021

(65) Prior Publication Data

US 2021/0406127 A1     Dec. 30, 2021

(30) Foreign Application Priority Data

Jun. 26, 2020 (EP) .................................... 20182514

(51) Int. Cl.
*G06F 11/14* (2006.01)
*G06F 9/455* (2018.01)
*G06F 9/50* (2006.01)

(52) U.S. Cl.
CPC ........ *G06F 11/142* (2013.01); *G06F 9/45558* (2013.01); *G06F 9/5005* (2013.01);
(Continued)

(58) Field of Classification Search
CPC ............... G06F 11/142; G06F 11/1471; G06F 11/1482; G06F 9/45558; G06F 9/50005; G06F 2009/4557; G06F 9/5005
See application file for complete search history.

(56) References Cited

U.S. PATENT DOCUMENTS 6,795,966 B1 * 9/2004 Lim ..................... G06F 11/1438
                                                                    718/1
8,259,119 B1 * 9/2012 Diard .................... G06F 1/3293
                                                                    345/503
(Continued)

FOREIGN PATENT DOCUMENTS

CA        2978447 A1 *  3/2019   .......... G06F 11/0793

OTHER PUBLICATIONS

Khazaei, Hamzeh et al; "SAVI-IoT: A Self-Managing Containerized IoT Platform";2017; IEEE; 5th International Conference on Future Internet of Things and Cloud (FICLOUD); Aug. 21, 2017; pp. 227-234; XP033257877; DOI: 10.1109/FICLOUD.2017.27; 2017.
(Continued)

*Primary Examiner* — Joseph O Schell
(74) *Attorney, Agent, or Firm* — Schmeiser, Olsen & Watts LLP (57) ABSTRACT

Provided is a method for orchestrating a container-based application that is executed on a terminal device, in which implementation information is received in an orchestration slave unit on the terminal device via a communication connection from an orchestration master unit, and the application is configured and/or controlled by the orchestration slave unit based on the implementation information, wherein the received implementation information is additionally saved persistently in a memory unit in the terminal device, and if the communication connection to the orchestration master unit is interrupted, the most recently saved implementation information is retrieved from the orchestration slave unit and the application is configured and/or controlled based on the most recently saved implementation information.

12 Claims, 4 Drawing Sheets

(52) U.S. Cl.
CPC ...... *G06F 11/1471* (2013.01); *G06F 11/1482* (2013.01); *G06F 2009/4557* (2013.01)

(56) References Cited

U.S. PATENT DOCUMENTS

| | | | | |
|---|---|---|---|---|
| 11,463,374 | B2* | 10/2022 | Chen | H04L 47/823 |
| 2003/0115256 | A1* | 6/2003 | Brockway | H04L 67/30 |
| | | | | 709/203 |
| 2007/0043860 | A1* | 2/2007 | Pabari | G06F 9/45558 |
| | | | | 709/224 |
| 2009/0216975 | A1* | 8/2009 | Halperin | G06F 9/4856 |
| | | | | 718/1 |
| 2011/0153791 | A1* | 6/2011 | Jones | H04L 41/082 |
| | | | | 709/221 |
| 2012/0066673 | A1* | 3/2012 | Miller, III | H04L 67/34 |
| | | | | 717/171 |
| 2012/0131323 | A1* | 5/2012 | Gattegno | G06F 3/0635 |
| | | | | 709/213 |
| 2012/0246501 | A1* | 9/2012 | Haruki | G06F 1/3228 |
| | | | | 713/323 |
| 2013/0246364 | A1* | 9/2013 | Bhavith | G06F 11/1471 |
| | | | | 707/648 |
| 2013/0247045 | A1* | 9/2013 | Fitzgerald | G06F 9/455 |
| | | | | 718/1 |
| 2013/0332924 | A1* | 12/2013 | Shaposhnik | G06F 21/57 |
| | | | | 718/1 |
| 2014/0157266 | A1* | 6/2014 | Fletcher | G06F 11/1484 |
| | | | | 718/1 |
| 2014/0201572 | A1* | 7/2014 | Dancy | H04L 41/0893 |
| | | | | 714/37 |
| 2015/0074661 | A1* | 3/2015 | Kothari | H04L 41/0863 |
| | | | | 718/1 |
| 2016/0314010 | A1* | 10/2016 | Haque | G06F 9/45558 |
| 2018/0024889 | A1* | 1/2018 | Verma | G06F 9/445 |
| | | | | 714/15 |
| 2019/0220361 | A1* | 7/2019 | Mageswaran | G06F 11/302 |
| 2019/0370023 | A1* | 12/2019 | Israni | G06F 3/065 |
| 2021/0248047 | A1* | 8/2021 | Jayaram | G06F 9/45558 |

OTHER PUBLICATIONS

Wiener Patrick et al; "Towards Context-Aware and Dynamic Management of Stream Processing Pipelines for Fog Computing"; 2019; IEEE; 3rd International Conference on Fog and Edge Computing (ICFEC); May 14, 2019; pp. 1-6; XP033559901; DOI: 10.1109/CFEC.2019.8733145.

Javed, Asad et al; "CEFIoT: A Fault-Tolerant IoT Architecture for Edge and Cloud"; 2018; IEEE 4th World Forum on Internet of Things (WF-IOT); Feb. 5, 2018; pp. 813-818; XP033338434; DOI: 10.1109/WF-IOT.2018.8355149.

* cited by examiner

ORCHESTRATING A CONTAINER-BASED APPLICATION ON A TERMINAL DEVICE

CROSS-REFERENCE TO RELATED APPLICATIONS

This application claims priority to European Application No. 20182514.8, having a filing date of Jun. 26, 2020, the entire contents of which are hereby incorporated by reference.

FIELD OF TECHNOLOGY

The following relates to a method and to a system for orchestrating a container-based application that is executed on a terminal device.

BACKGROUND

Software applications, referred to below simply as applications, are increasingly implemented by what are known as containers on devices such as, for example, Internet-of-things (IoT) devices or edge devices that form an entry point into a service provider network. In a container-based implementation of an application, the components of an application software are bundled in one or a plurality of containers together with the libraries and the like necessary for their execution, and are executed in a local run-time environment in the device. The question of which system resources of the device can be assigned to the processes in a container can be managed and controlled through containerization.

Such container-based applications are usually distributed and controlled by a central management system, for example an orchestration system such as "Kubernetes". The orchestration system orchestrates working processes running in containers that are executing at nodes, for example physical or virtual machines in a cluster. The cluster, together with its nodes, is controlled by a dedicated orchestration master, for example a Kubernetes master, that distributes and manages the containers at the nodes. To this end the orchestration master communicates in a master-slave relationship, as known in information technology, with an orchestration slave, for example the program "Kubelet", at each individual node. The orchestration slave is responsible for the status of the node. The orchestration slave is controlled by a controller manager in the orchestration master, and performs the starting and stopping of containers. The orchestration slave reports the status to the orchestration manager at short time intervals. In the event of an error or of the node being unreachable, the orchestration master recognizes this due to the status not being reported. Conventionally the controller manager then restarts the containers, but at other "available" nodes.

A typical application scenario of container-based applications is thus an architecture in which the device on which a container runs is unimportant, and in which containers run in an arbitrarily distributed manner on various devices and are scaled. Applications or their configuration on containers can, however, be managed in a device-specific manner in that containers are given a fixed assignment to a single device by what are known as node selectors. A continuous connection between the orchestration master and the orchestration slave on the device is necessary for the fault-free running of such a container-based application.

A permanent connectivity between the device and an orchestration master cannot be guaranteed, in particular in the case of mobile Internet-of-things devices that are, for example, installed in trains or automobiles. It is also possible for this connection to fail over a longer period of time. Such a loss of connection can be brought about by a failure of the orchestration master or also by the termination, and thus loss, of the transmission connection itself. In the latter case the terminal device is completely disconnected from a supporting network with servers that, for example, communicate with the application, and is thus also unable to send any data to network-side interfaces of the application such as, for example, reporting systems. In both kinds of connection interruption, restarting the device has the effect that the information regarding which container-based components should be started on the terminal device is no longer present. The cause of this is that the information for a restart is retrieved from the orchestration master by the orchestration slave installed on the device when the device or the component itself is started. The reason for this behavior is that in typical application fields, such as container virtualization, as, for example, in the case of cloud computing, the Kubernetes master swaps resources out to other terminal devices when the terminal device is unavailable.

This option for swapping out is often not available in an Internet-of-things environment, since a majority of container-instances run exclusively on the one device intended. Safety-critical applications in particular, which have to be highly available, can thus not be provided as a container-based application.

SUMMARY

An aspect relates to an orchestration system, or an orchestration method, in which the service provided can continue to be executed without interruption even in the absence of a connection between the orchestration master and a terminal device.

According to a first aspect, embodiments of the invention relate to a method for orchestrating a computer-based application that is executed on a terminal device, in which implementation information is received in an orchestration slave unit on the terminal device via a communication connection from an orchestration master unit, and the application is configured and/or controlled by the orchestration slave unit based on the implementation information, wherein the received implementation information is additionally saved persistently in a memory unit in the terminal device; if the communication connection to the orchestration unit is interrupted, the most recently saved implementation information is retrieved from the orchestration slave unit and the application is configured and/or controlled based on the most recently saved implementation information.

A terminal device refers to a dedicated device such as, for example, an Internet-of things (IoT) device or an edge device on which the application is executed, in contrast to a device or system that consists of a plurality of components and the application can be executed on one or a plurality of arbitrary components. An orchestration master unit such as, for example, a Kubernetes master, is here arranged in a unit that is physically separate from the terminal device that belongs, for example, to a control network. The container-based application here communicates, for example, with an application-specific unit in the control network for the exchange of application data. The orchestration master unit communicates with the orchestration slave unit via a communication connection for orchestrating the container-based application. If the communication connection to the orchestration master unit is interrupted, this can be a result, for example, of unavailability of the orchestration master unit, or through a failure of the communication connection itself. Both possibilities are included in an interruption of the communication connection. Implementation information, which can also be referred to as deployment information, is actively transmitted from the orchestration master unit to the orchestration slave unit. The implementation information only changes if an administrator at the orchestration master performs changes in relation to the application. The implementation information is subsequently transmitted from the orchestration master unit to the orchestration slave unit.

Through the persistent, i.e., non-volatile, storage of the received implementation information in a storage unit in the terminal device, this information can be retrieved locally in the terminal device from the orchestration slave unit, and the application can be reactivated or maintained even in the absence of a connection to the orchestration master unit. A continuous provision of the application is thus ensured. Thus even safety-critical services that must be available on the terminal device with high security against failure can be provided in container-based form. If the communication connection is intact, then in the event of a failure of the application on the terminal device, the implementation information is retrieved again by the orchestration slave unit from the orchestration master unit.

In an advantageous embodiment, if the communication connection to the orchestration master unit is interrupted, and if at least one container instance fails at the terminal device, the at least one container instance is restarted by the orchestration slave unit using the most recently saved implementation information.

Usually an orchestration slave unit will not restart a container instance until receiving a return message from the orchestration master unit on the basis of the received message. Due to the implementation information saved persistently in the memory unit, the orchestration slave unit can now promptly restart a corresponding container instance autonomously. A container instance refers to a concrete container execution environment with a corresponding application program that is described by the implementation information on the basis of a container image.

In an advantageous embodiment, if the communication connection to the orchestration master unit is interrupted and the terminal device is restarted, the application is started by the orchestration slave unit using the most recently saved implementation information.

The application can thus be reactivated on the terminal device even when the terminal device is restarted, not only when the application fails on the running terminal device. The terminal device can thus be started from the switched-off state, without a connection to the orchestration master unit, and can be reconfigured and restarted by the orchestration slave unit based on the saved implementation information. In the way of working usual in the past between the orchestration master unit and the orchestration slave unit, the application was not started on the terminal device, since when the terminal device was switched off the implementation information would also have been deleted and, due to the absence of a communication connection, no new implementation information is received in the orchestration slave unit from the orchestration master unit. This changed behavior can, for example, be realized by a dedicated orchestration slave "plug-in" in the terminal device.

In an advantageous embodiment, a prioritized container instance is identified as "prioritized" when the implementation information is prepared by the orchestration master unit.

This makes it possible, for example, to identify a safety-relevant container instance as a prioritized container instance. During the run time of the application, the prioritized container is identified and is preferentially instantiated again by the orchestration slave unit and restarted, in particular in the short term and preferentially with respect to time over other containers. Such a prioritized container instance can, for example, be identified by a label in the implementation information. An implementation of applications with higher availability, such as for example safety-relevant applications, is thus also possible in a container-based manner.

In an advantageous embodiment, at least one contingency container image is saved in the memory unit, wherein the image executes at least one function which, when the communication connection is present, is executed by an application interface connected to the terminal device via the communication connection.

Thus all the data and/or messages that are sent, when the communication connection is present, by the container-based application in the terminal device to an application interface arranged locally separated from the terminal device, are saved. After a restoration of the communication connection with the application interface, for example in a backend system, or a distributed server system, or also in a control network, it can thus be handled there in the manner usual for the application. Messages or information that are sent from the orchestration slave unit to the orchestration master unit can also be saved in a contingency container instance and, when the communication connection is reconnected to the orchestration master unit and is active, can be transmitted to the orchestration master unit.

This makes it possible to trace, after the event, whether a component has been restarted locally more than once, and whether the contingency mode has been activated at all.

In one advantageous embodiment, the orchestration slave unit changes the configuration and/or the control of the application depending on a contingency policy received from the orchestration master unit.

The contingency policy here is a part of the implementation information, and is saved with that information persistently in the memory unit. The contingency policy is an additional component of the implementation information. The contingency policy defines, for example, when individual contingency measures are activated. For example, a timespan following a mains failure after which the contingency actions are started can be defined.

In an advantageous embodiment, the orchestration slave unit starts the at least one contingency container instance and/or stops at least one working container instance of the application depending on the contingency policy.

Ascertained sensor data can, for example, be temporarily saved or processed by a contingency container instance, which would, with an active communication connection, have been executed by the application interface connected to the terminal device. By stopping working containers, resources can be released and, for example, assigned to a contingency container instance. The container-based application can thus be carried out with as little interruption as possible, and in accordance with the usual execution.

In an advantageous embodiment, the contingency policy comprises different level policies and, depending on an ascertained contingency level, a level policy assigned to the contingency level is activated by the orchestration slave unit.

A level policy can, for example, be identified by different identifiers, known as labels. This enables a reaction of the terminal device that is matched to the respective situation and therefore very flexible, and a flexible configuration of the application in case of need.

In an advantageous embodiment, the contingency level is ascertained depending on a duration and/or a type of the failure of the communication connection and/or of the master orchestration unit.

Multiple escalation levels can thus be defined, depending on the duration and type of the failure, and appropriate measures introduced.

In an advantageous embodiment, depending on the assigned level policy, further contingency container instances are started, and/or different amounts of resources are assigned to the at least one contingency container instance for the duration of the ascertained contingency level.

By adapting the resources, the operation of the application can be maintained with its usual scope even in the event of a relatively long failure of the communication connection or of the orchestration master unit.

In an advantageous embodiment, depending on the assigned level policy, container instances that are present but are not necessary for the contingency operation are stopped, paused, or their resources assignments are changed, and resources that have thereby become free are assigned to the contingency container instance.

This enables a flexible contingency operation of the application that is adapted to the contingency situation. A corresponding container image in the implementation information can be changed, for example in that the assigned CPU quota is reduced.

In an advantageous embodiment, after restoring the communication connection, the data collected in the contingency container instance is transmitted to the application interface that is connected to the terminal device via the communication connection.

As a result, data, information or messages that have been generated or collected during the contingency operation or during the failure of the communication connection with the orchestration master unit, are not lost, and can be evaluated or processed in the application interface, for example in a backend cloud environment or in a control node of a control network. Measures can, for example, be derived from the transmitted data and executed.

In an advantageous embodiment, after restoring the communication connection, a normal operation policy is received from the orchestration master unit in the orchestration slave unit, and the terminal device is transferred into a normal state. The container-based application can thus be transferred to the usual execution environment and execution mode in the terminal device.

A second aspect of embodiments of the invention relates to a system for orchestrating a container-based application that is executed on a terminal device, comprising a terminal device that contains an orchestration slave unit and an orchestration master unit connected via a communication connection to the terminal device, that is designed to receive implementation information in the orchestration slave unit via the communication connection from the orchestration master unit, to configure and/or to control the application by the orchestration slave unit based on the implementation information, wherein the received implementation information is additionally saved persistently in a memory unit in the terminal device, and if the communication connection is interrupted, to retrieve the most recently saved implementation information from the orchestration slave unit and the application is configured and/or controlled based on the most recently saved implementation information.

With such a system, container-based applications, in particular applications that execute a safety-critical or operational-safety-relevant function, can also be implemented on a certain permanently predefined terminal device, since even in the event of a failure of the communication connection, the operation of the application can be continued and thus ensured. This can, for example, be realized by a dedicated orchestration slave "plug-in" in the terminal device.

A third aspect of embodiments of the invention relate to a computer program product (non-transitory computer readable storage medium having instructions, which when executed by a processor, perform actions) comprising a non-volatile, computer-readable medium that can be loaded directly into a memory of a digital computer, comprising program code segments that are suitable for carrying out the method.

The respective unit, for example the orchestration master unit, orchestration slave unit or also the memory unit can be implemented using hardware and/or software technology. In a hardware implementation, the respective unit can be designed as an apparatus or as part of an apparatus, for example as a computer or as a microprocessor or as a control computer or as part of a control computer of a vehicle. In a software implementation, the respective unit can be designed as a computer program product, as a function, as a routine, as part of a program code or as an executable object. In the context of embodiments of the invention, a memory unit can, for example, be a hard disk or another storage medium on which data can be saved persistently.

A computer program product such as, for example, a computer program means can, for example, be provided or supplied as a memory card, USB stick, CD-ROM, DVD, or also in the form of a file downloadable from a server in a network.

BRIEF DESCRIPTION

Some of the embodiments will be described in detail, with references to the following Figures, wherein like designations denote like members, wherein.

DETAILED DESCRIPTION

Figure 1:
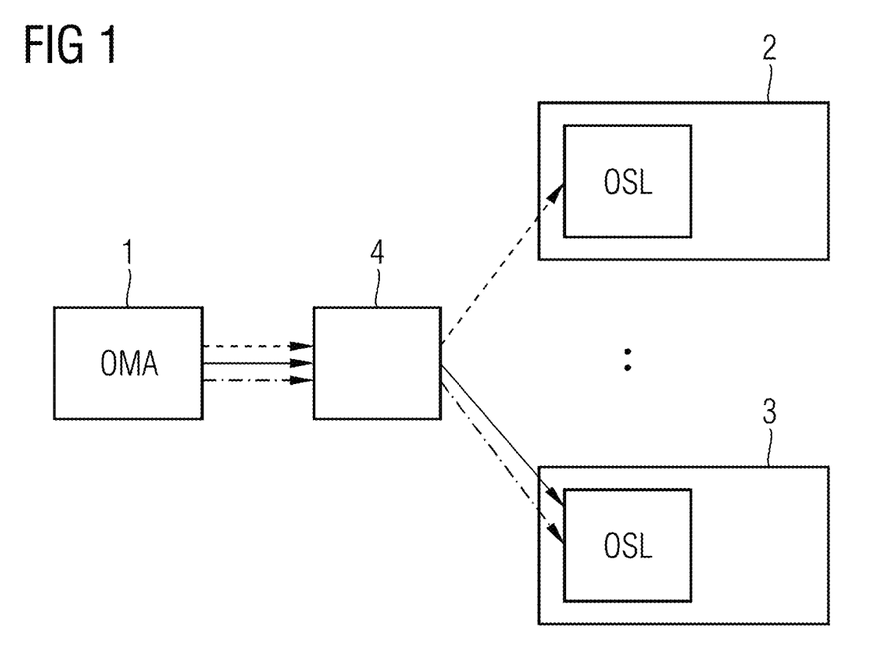
FIG. 1 shows a schematic illustration of an example of a known architecture for administering a container-based application that is provided to a service user by one or a plurality of servers.

FIG. 1 shows a typical architecture for administering a computer-implemented application by a server 1 that is provided to a user of the application by one or a plurality of nodes 2, 3. An application is executed here by program parts that are provided in one or a plurality of containers. A container, or a container virtualization, here is a method of operating multiple instances of an operating system, isolated from one another on a host system. For container administration or management, orchestration programs, such as Kubernetes, for example, are often used. The orchestration program controls an automatic distribution, scaling and servicing of containers on distributed host systems, known as nodes 2, 3.

FIG. 1 shows such an orchestration master unit OMA, that distributes and administers the containers to the individual nodes 2, 3. The orchestration master unit OMA decides which containers are started on which of the nodes 2, 3, depending on the available resources. The orchestration master unit OMA administers the containers disposed on the nodes 2, 3, and monitors their load. For this purpose, the orchestration master unit OMA makes implementation information available to the individual nodes 2, 3; this is received by a corresponding orchestration slave unit OSL in the nodes 2, 3, and forwards it to a runtime environment for execution of the container. In addition to the scheduler contained in the orchestration master unit OMA, the messages are distributed to the various nodes 2, 3 by the orchestration master unit OMA via a load distributor 4. The orchestration master unit is, for example, disposed in a control unit of a backend system 1. In the case of such a service or of such an architecture, the nodes 2, 3 on which container runs is irrelevant, but rather are they distributed and scaled arbitrarily on different nodes.

Figure 2:
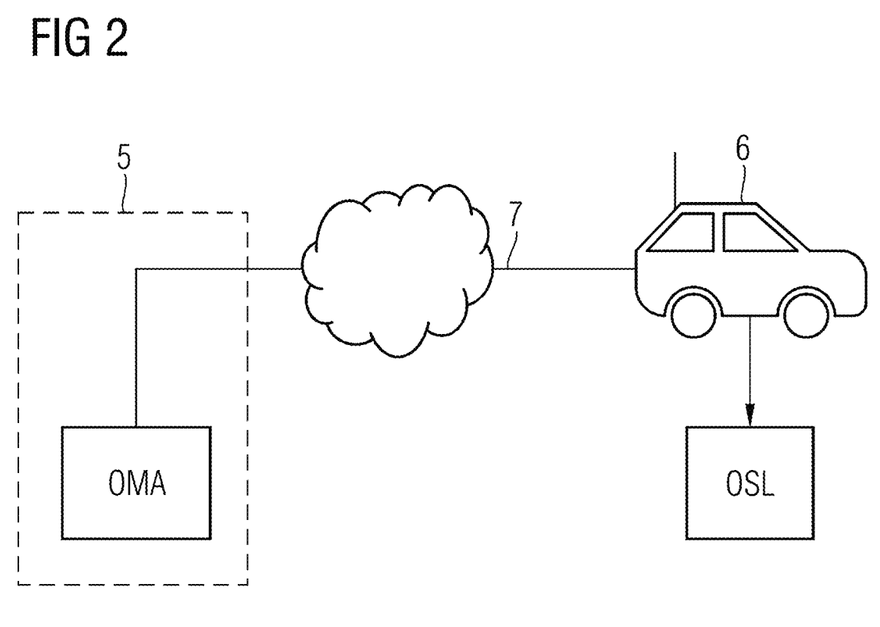
FIG. 2 shows a schematic illustration of an example of a container-based application that is executed on a predefined terminal device.

A container-based application can nevertheless be administered in a device-specific manner, in that, by what are known as node selection identifiers or as node selectors, the container has a fixed assignment to a node. FIG. 2 shows such an application scenario, in which a service is executed on a terminal device, installed here by way of example in a vehicle 6. For this purpose the terminal device, here, by way of example, the vehicle 6, contains an orchestration slave unit OSL that receives control information for the individual containers via a communication connection 7 from an orchestration master unit OMA. The orchestration master unit OMA is, for example, disposed in a control unit in a backend server 5 of a service provider. The application described can, in particular, be provided in an Internet-of-things device that communicates independently via the communication connection 7 to the orchestration master unit OMA.

In particular in the case of terminal devices that are connected via a radio interface to a backend system 5, it cannot be assumed that a permanent connection to the orchestration master unit OMA is present, but rather that this can be absent, even for a relatively long period of time. This interruption in the connection can be caused by the failure of the orchestration master unit OMA or by a failure of the communication connection 7. This is possible in the case of terminal devices as a result of a poor or missing radio connection. As a result, the terminal device 6 is completely isolated from the backend server 5, and is also thus unable to send any data to existing reporting systems. In both kinds of connection interruption, restarting the terminal device or the application has the effect that the information regarding which container-based application components should be started on the terminal device is no longer present.

A computer-based application is continued in the presence of both types of connection interruption by the method and system described below. For this purpose, the orchestration slave unit OSL operated on the terminal device for the orchestration saves the implementation information received most recently from the orchestration master unit OMA persistently on the terminal device. When the terminal device is restarted then, if there is no connection to the orchestration master unit OMA, the most recently known implementation information is started.

Figure 3:
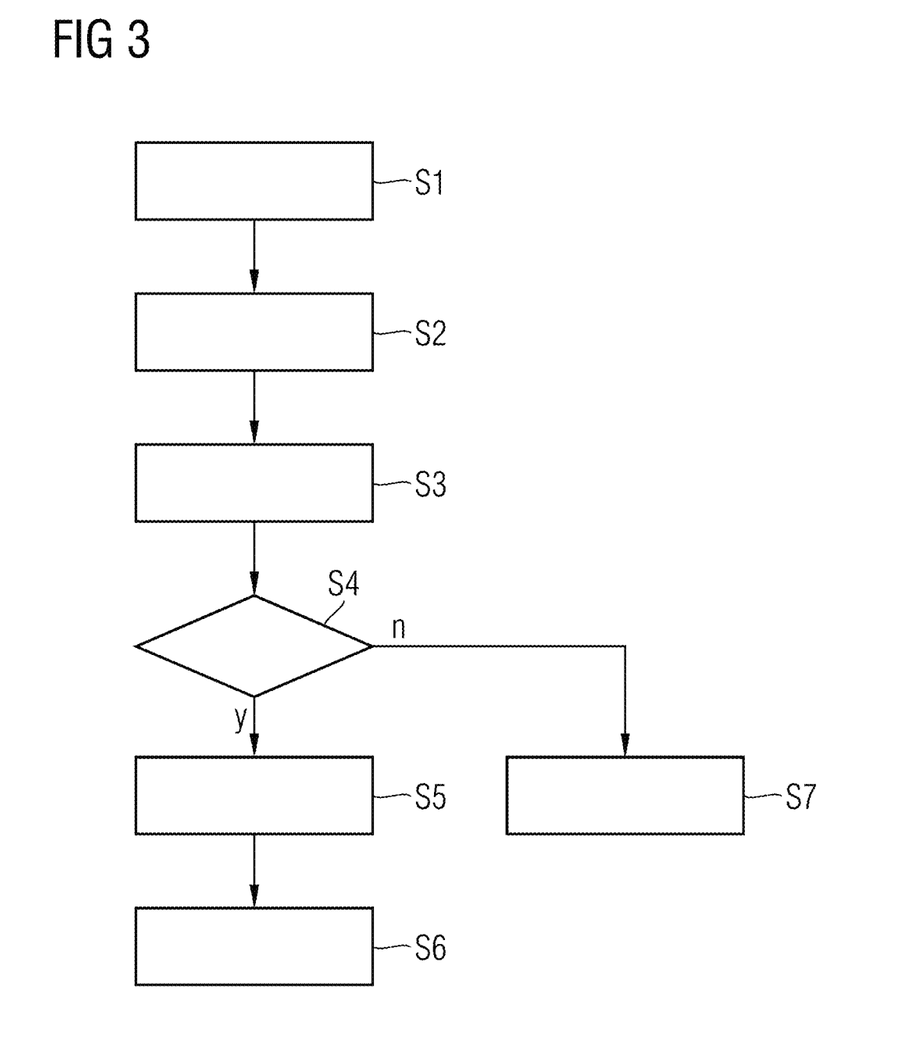
FIG. 3 shows a first exemplary embodiment of the method as a flow diagram.

The method will now be explained in more detail with reference to FIG. 3. In a first method step S1, the implementation information is received in the orchestration slave unit OSL from an orchestration master unit OMA via a communication connection. In method step S2, the application is configured and/or controlled by the orchestration slave unit OSL based on the implementation information. In the following step S3 the implementation information received is also saved persistently, i.e., permanently and also continuing to be available when the terminal device has been switched off, in a memory unit in the terminal device. If, in step S4, the terminal device establishes that the communication connection to the orchestration master unit OMA has been interrupted, the most recently saved implementation information is retrieved from the storage unit by the orchestration slave unit OSL, see S5. The application is configured and/or controlled based on this most recently received implementation information, see S6. If it is established in the terminal device that the communication connection to the orchestration master unit OMA is present, see the arrow n in FIG. 3, the orchestration slave unit OSL also receives the control information from the orchestration master unit OMA, and executes it accordingly.

Application-specific information, or data collected by the application, are also transmitted via the existing communication connection to the orchestration master unit OMA, or to an interface specific for the application. In the event of a crash or interruption of the application in the terminal device, then if a communication connection is present, the orchestration master unit OMA can transmit implementation information again to the orchestration slave unit OSL, and restart the application in the terminal device. The received implementation information is here again treated in accordance with method steps S1-S3, and the new implementation information is again saved persistently in the memory unit. The memory unit of the terminal device thus also has the most recent, up-to-date implementation information.

The implementation information contains, inter alia, a container image that comprises operations and files for the application components that a container is to execute. The orchestration slave unit OSL starts one or a plurality of container instances as required, that are configured and executed in accordance with the container image. If a container instance fails on the terminal device, and if the communication connection to the orchestration master unit OMA is interrupted, the container instance is started based on the most recently saved implementation information. A return message from the orchestration master unit OMA is only awaited for a specific maximum duration, if at all. This changed behavior can, for example, be realized by a plug-in in the orchestration slave unit OSL.

In order to be able to provide safety-critical container instances that include safety-critical application modules without interruption, safety-critical container instances are identified when they are created on the orchestration master using special identifiers, for example by labels. Such prioritized container instances can then be treated preferentially by the orchestration slave unit OSL in the event of interrupted communication. For this purpose at least one contingency container image is saved in the memory unit, wherein the image executes at least one function that, when the communication connection is present, is executed by an application interface connected to the terminal device via the communication connection.

Depending on a contingency policy received from the orchestration master unit OMA, the orchestration slave unit OSL furthermore changes the configuration and higher-level control of the application. The contingency policy is preferably contained in the implementation information, and can thus also be changed with every implementation information. The contingency policy is thus also persistently saved in the memory unit, and is thus available on the terminal device in the event of a failure of the communication connection to the orchestration master unit OMA.

The orchestration slave unit OSL can then, depending on the contingency policy, start the at least one contingency container instance and/or stop at least one working container instance of the application. The contingency policy can, for example, depending on the time that has elapsed since the communication connection failure, stop individual working container instances, in particular non-critical ones, and start a first one or even more contingency container instances.

The contingency policy can comprise different level policies. Level policies thus form a hierarchy of policies which, depending on the type and duration of a contingency situation, which is in turn assigned to a specific contingency level, are activated by the orchestration slave unit OSL. The contingency level can be ascertained depending not only on the duration of the failure of the communication connection, but also depending on the type of the failure of the communication connection and/or the type of the failure of the orchestration master unit OMA. Different contingency levels can, for example, be present or assigned to a failure of the communication connection itself, and a different contingency level when there is a failure in the orchestration master unit OMA. Further different contingency levels can be assigned, depending on the duration or combination of failures. One or a plurality of contingency levels can here again be assigned to one or also to a plurality of level policies. Depending on the level policy, further contingency container instances can be started, or it is possible for different amounts of resources to be assigned to a contingency container instance that already exists for the duration of the ascertained contingency level.

Following a restoration of the communication connection itself or a restoration or availability of the orchestration master unit OMA, the data collected in the at least one contingency container instance are transmitted to the application interface. The data collected in a contingency container instance during the failure are thus not lost, and can be received and evaluated or forwarded by the application interface at the backend. After the restoration of the communication connection, a normal operation policy is received in the orchestration slave unit OSL from the orchestration master unit OMA, and the terminal device transferred to a normal state. At least one contingency policy, however, remains available in the memory unit, so that if the connection to the orchestration master unit OMA is interrupted again, the application can continue to be operated by the terminal device alone.

Figure 4:
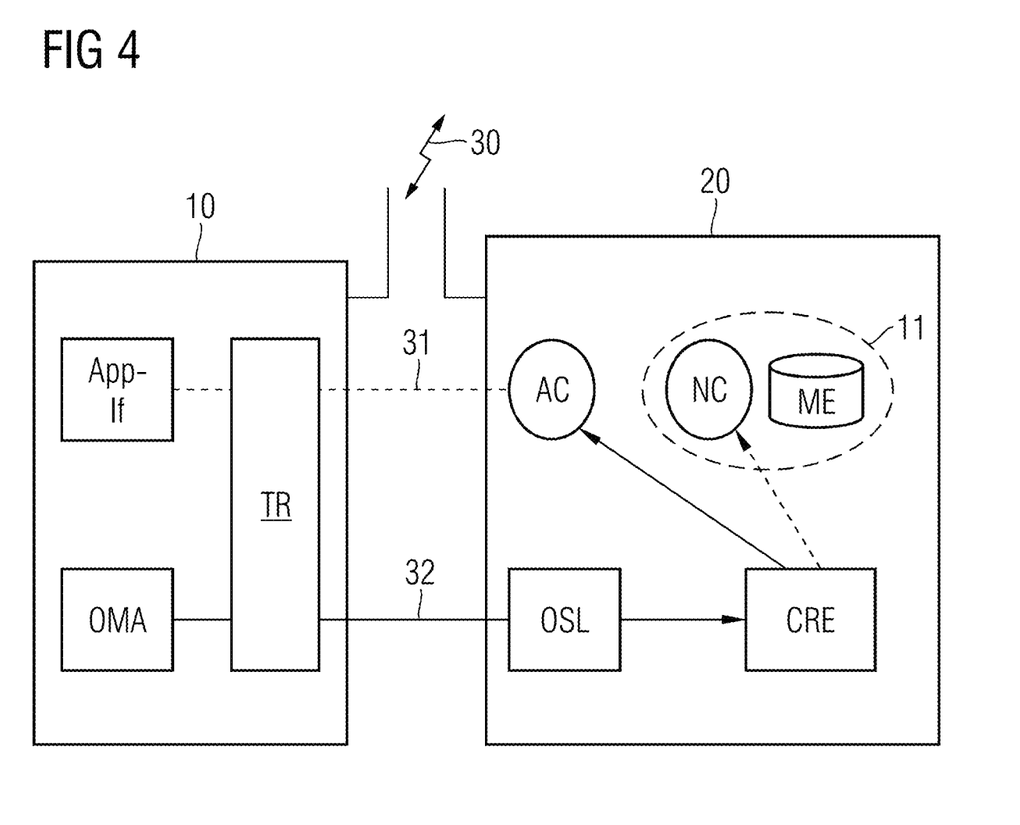
FIG. 4 shows a block diagram of an exemplary embodiment of the system.

An exemplary embodiment of a system for orchestrating a container-based application is illustrated in FIG. 4. The system comprises a terminal device 20 and an application interface 10 connected to the terminal device. This application interface 10 comprises an orchestration master unit OMA, as well as a unit App-If specific for the application in which, for example, data that were ascertained by the application on the terminal device are received and processed further. The application interface 10 further comprises a sending and receiving interface TR that receives data from the terminal device 20 or sends it to the terminal device 20. The communication interface is illustrated as a radio interface 30 by way of example. Logically, the communication between the application interface 10 and the terminal device 20 can be disconnected in a communication between the orchestration master unit OMA and the orchestration slave unit OSL of the container-based application, see connection 32, and the communication, see 31, between, for example, a working container AC in the terminal device 20 and a unit App-If specific for the application in the application interface 10.

The terminal device 20 comprises the orchestration slave unit OSL, which in turn forwards instructions to a runtime environment CRE. The runtime environment CRE configures and starts working container instances AC in accordance with the instructions of the orchestration slave unit OSL. If a contingency level is present, and a contingency policy is accordingly active, a corresponding contingency container NC is configured and started.

The terminal device 20 further comprises a memory unit ME on which the implementation information that the orchestration slave unit OSL has received from the orchestration master unit OMA is persistently saved. The terminal device 20 can, for example, be a mobile terminal device, for example a terminal device installed or arranged in an automobile or else in a train. The terminal device 20 can also be a field device or another component in an automation plant that is connected via a wired terminal, in particular a wired data network, to a control apparatus that is arranged in the application interface 10. The communication interface can in general be a radio transmission path or else a wired communication connection, or a glass-fiber connection or the like.

Figure 5:
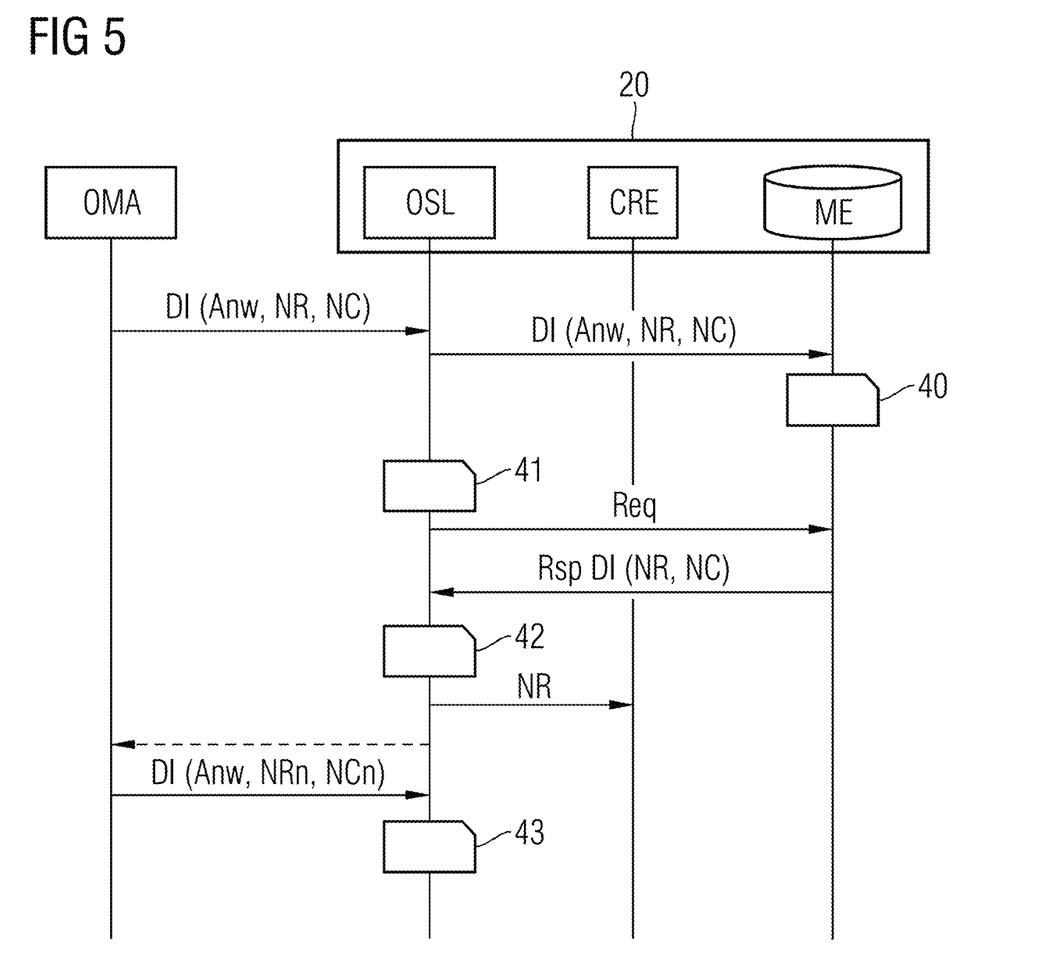
FIG. 5 shows a second exemplary embodiment of the method as a message flow.

FIG. 5 shows a flow of information that is exchanged between the orchestration master unit OMA and the terminal device 20 for the control and configuration of the container-based application. The components in the terminal device 20 that are relevant for the administration of the container-based application are the orchestration slave unit OSL, the runtime environment CRE, and the memory unit ME. The implementation information DI is transmitted from the orchestration master unit OMA to the orchestration slave unit OSL in the terminal device 20. In addition to the information Anw necessary for the normal operation of the application, the implementation information DI comprises a contingency policy NR and, optionally, a contingency container image NC. After being received in the terminal device 20, the implementation information DI is saved persistently, i.e., in a non-volatile manner, in the memory unit ME, see 40.

If a failure of the communication connection or of the connection to the orchestration master unit OMA is established in the terminal device 20, see 41, the orchestration slave unit OSL requests the saved implementation information DI and, in particular, the contingency policy NR and the contingency container image NC, see 42. After this the necessary contingency container instances or configuration changes in the existing working container instances and contingency container instances are carried out via the runtime environment CRI based on the contingency policy NR.

The contingency policy NR can be designed such that different contingency measures are executed by different contingency levels that are assigned depending on the duration and the type of the connection failure. In addition to starting temporary contingency container instances, larger amounts of resources such as, for example, processor time or local memory, can also be made available to the contingency container instance for the duration of the failure. Container images that are not relevant to the contingency and are saved locally can be deleted after a period of time has elapsed to make resources available for the contingency container instances, while container instances that are still running are retained. These measures are also predefined by the contingency policy or the corresponding level policy.

As soon as the communication connection to the network is present again the data that have been collected and saved locally, for example in a contingency container instance, can, for example, be sent back to the application interface. Resources made available for the contingency operation are released again. If relevant, an updated contingency policy is then received in the orchestration slave unit OSL from the orchestration master unit OMA, and the terminal device 20 transferred into a normal state, see 43.

The solution described does not require an orchestration master unit OMA to be arranged on the terminal device 20 itself. Resources in the terminal device 20 can be saved in this way or can be used for operation of the application. Through the proposed contingency policy NR, contingency measures can be taken on the terminal device 20 autonomously, depending on the time duration and type of the failure, and relatively large amounts of resources or alternative resources can, for example, be provided temporarily for core components. Security measures taken on the terminal device 20 can be intensified by the contingency policy under time control, for example as the duration of the failure grows. The central administration and software provision mechanism is retained.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for orchestrating a container-based application that is executed on a terminal device, the method comprising:
receiving implementation information in an orchestration slave unit on the terminal device via a communication connection from an orchestration master unit, wherein the orchestration slave unit is controlled by a control manager in the orchestration master unit, and the orchestration slave unit reports a status at short time intervals; and
configuring and/or controlling the application by the orchestration slave unit based on a contingency policy contained within the implementation information, wherein the implementation information is additionally saved persistently in a memory unit in the terminal device;
wherein, if the communication connection to the orchestration master unit is interrupted, a most recently saved implementation information is retrieved from the orchestration slave unit and the application is configured and/or controlled based on a contingency policy of the most recently saved implementation information, and a safety-relevant container instance, identified by the orchestration master unit, is preferentially instantiated by the orchestration slave unit;
wherein the contingency policy of the most recently saved implementation information is designed such that different contingency measures are executed by different contingency levels;
wherein the orchestration slave unit changes a configuration and/or a control of the application depending on the contingency policy received from the orchestration master unit;
wherein the orchestration slave unit starts an at least one contingency container instance and/or stops at least one working container instance of the application depending on the contingency policy, and the different contingency levels comprise different level policies and, depending on an ascertained contingency level, a level policy assigned to the contingency level is activated by the orchestration slave unit.

2. The method as claimed in claim 1, wherein if the communication connection to the orchestration master unit is interrupted, and if at least one container instance fails at the terminal device, the at least one container instance is restarted by the orchestration slave unit using the most recently saved implementation information.

3. The method as claimed in claim 1, wherein if the communication connection to the orchestration master unit is interrupted and the terminal device is restarted, the application is started by the orchestration slave unit using the most recently saved implementation information.

4. The method as claimed in claim 1, wherein the prioritized container instance is identified as prioritized when the implementation information is prepared by the orchestration master unit.

5. The method as claimed in claim 1, wherein at least one contingency container image is saved in the memory unit, and the at least one contingency container image executes at least one function which, when the communication connection is present, is executed by an application interface connected to the terminal device via the communication connection.

6. The method as claimed in claim 1, wherein the contingency level is ascertained depending on a duration and/or a type of a failure of the communication connection and/or of the master orchestration unit.

7. The method as claimed in claim 6, wherein, depending on the level policy, an at least one further contingency container instance is started and/or different amounts of resources are assigned to the at least one contingency container instance for a duration of the contingency level.

8. The method as claimed in claim 7, wherein, depending on the level policy, container instances that are present but are not necessary for the contingency operation are stopped, paused, or resource assignments are changed, and resources that have thereby become free are assigned to the contingency container instance.

9. The method as claimed in claim 8, wherein, after restoring the communication connection, data collected in the contingency container instance is transmitted to an application interface.

10. The method as claimed in claim 1, wherein after restoring the communication connection, a normal operation policy is received from the orchestration master unit in the orchestration slave unit, and the terminal device is transferred into a normal state.

11. A system for orchestrating a container-based application that is executed on a terminal device, comprising:
an orchestration slave unit associated with the terminal device;

an orchestration master unit connected via a communication connection to the terminal device, wherein the orchestration slave unit is controlled by a control manager in the orchestration master unit, and the orchestration slave unit reports a status at short time intervals, the system configured to:

receive implementation information in the orchestration slave unit via the communication connection from the orchestration master unit; and configure and/or to control the application by the orchestration slave unit based on a contingency policy contained within the implementation information, wherein the implementation information is additionally saved persistently in a memory unit in the terminal device;

wherein, if the communication connection is interrupted, the most recently saved implementation information is retrieved from the orchestration slave unit and the application is configured and/or controlled based on a contingency policy of a most recently saved implementation information, and a safety-relevant container instance, identified by the orchestration master unit, is preferentially instantiated by the orchestration slave unit;

wherein the contingency policy of the most recently saved implementation information is designed such that different contingency measures are executed by different contingency levels;

wherein the orchestration slave unit changes a configuration and/or a control of the application depending on the contingency policy received from the orchestration master unit;

wherein the orchestration slave unit starts an at least one contingency container instance and/or stops at least one working container instance of the application depending on the contingency policy, and the different contingency levels comprise different level policies and, depending on an ascertained contingency level, a level policy assigned to the contingency level is activated by the orchestration slave unit.

12. A computer program product, comprising a computer readable hardware storage device having computer readable program code stored therein, said program code executable by a processor of a computer system to implement the method as claimed in claim 1.

* * * * *